(12) United States Patent
Charraud et al.

(10) Patent No.: US 11,423,342 B2
(45) Date of Patent: Aug. 23, 2022

(54) SALON SUSTAINABILITY SYSTEM

(71) Applicant: L'Oreal, Paris (FR)

(72) Inventors: Grégoire Charraud, Clichy (FR);
Céline Farcet, Annet sur Marne (FR)

(73) Assignee: L'Oreal, Paris (FR)

( * ) Notice: Subject to any disclaimer, the term of this patent is extended or adjusted under 35 U.S.C. 154(b) by 449 days.

(21) Appl. No.: 16/601,080

(22) Filed: Oct. 14, 2019

(65) Prior Publication Data

US 2021/0110324 A1     Apr. 15, 2021

(51) Int. Cl.
   *G06Q 10/06*     (2012.01)
   *A47C 1/11*      (2006.01)
   *G06Q 50/06*     (2012.01)
   *C02F 1/00*      (2006.01)

(52) U.S. Cl.
   CPC .......... *G06Q 10/06312* (2013.01); *A47C 1/11* (2013.01); *G06Q 10/06315* (2013.01); *G06Q 10/06395* (2013.01); *G06Q 50/06* (2013.01); *C02F 1/001* (2013.01)

(58) Field of Classification Search
   CPC ....... G06Q 10/06312; G06Q 10/06315; G06Q 10/06395; A47C 1/11; C02F 1/001
   USPC ........................................................ 702/100
   See application file for complete search history.

(56) References Cited

U.S. PATENT DOCUMENTS

2011/0320054 A1  12/2011  Brzezowski
2021/0110680 A1   4/2021  Charraud et al.

FOREIGN PATENT DOCUMENTS

JP       2005293130 A      10/2005
WO    WO 02067152 A1 *    8/2002   ......... G06Q 10/0639

OTHER PUBLICATIONS

International Search Report and Written Opinion of the International Searching Authority dated Nov. 13, 2020, issued in corresponding Application No. PCT/EP2020/078656, filed Oct. 12, 2020, 13 pages.

Nicolas, A., and Hadjur, C., "Système de traitement d'une eau usée contenant au moins un produit cosmétique, agencement et procédé associés," French Patent Application No. 1352921, filed Mar. 29, 2013, 18 pages.

* cited by examiner

*Primary Examiner* — John H Le
(74) *Attorney, Agent, or Firm* — Christensen O'Connor Johnson Kindness PLLC (57) ABSTRACT

In one embodiment, a salon sustainability resource management system is described. The salon sustainability resource management system includes one or more backwash stations, a sustainability status unit communicatively coupled to each of the one or more backwash stations. The sustainability status unit is configured to generate a virtual display including one or more instances of a current sustainability status associated with a utilization of at least one resource. An enticement unit is configured to activate one or more appraisals associated with the resource utilization at the backwash station. An integrated verdant unit is configured to predict a wholistic sustainability status associated with the current sustainability status at the sustainability status unit associated with each backwash station.

21 Claims, 8 Drawing Sheets

SALON SUSTAINABILITY SYSTEM

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a salon sustainability resource management system is described. The salon sustainability resource management system includes one or more backwash stations, a sustainability status unit communicatively coupled to each of the one or more backwash stations. The sustainability status unit is configured to generate a virtual display including one or more instances of a current sustainability status associated with a utilization of at least one resource. An enticement unit is configured to activate one or more appraisals associated with the resource utilization at the backwash station. An integrated verdant unit is configured to predict a wholistic sustainability status associated with the current sustainability status at the sustainability status unit associated with each backwash station.

In an aspect, the salon sustainability resource management system may also include a resource curation unit fluidly coupled to the one or more backwash stations. The resource curation unit may be configured to reduce consumption of one or more resources. In an aspect, the integrated verdant unit may also include a plaudit unit configured to generate one or more bounties based on positive appraisal from the enticement unit. In some aspects, the integrated verdant unit may include an ecological unit configured to accumulate kudos when the integrated verdant unit detects salon behavior reducing the utilization of the at least one resource. In an aspect, sustainability status unit may be further configured to illuminate a lighted display based at least in part on a current status of the utilization of at least one resource. In aspect, the sustainability status unit may also include at least one sensor configured to sense one or more characteristics of water proximate a backwash station and a processor in communication with the sensor for processing signals from the sensor and predicting a sustainability status of at least one resource associated with the use of the water at the backwash station. A remote server may be in communication with the processor to receive the predicted sustainability status associated with the backwash station, the remote server may be configured to calculate a total predicted sustainability status for multiple backwash stations. In aspect, the sustainability status unit may further include a light source proximate the backwash station, the light source in communication with the processor and the processor further configured to illuminate the light source a specific color based at least in part on the predicted sustainability status for the backwash station. In an aspect, the remote server may communicate the predicted sustainability status for the multiple backwash stations to the virtual display. In some embodiments, the processor may be further configured to generate a current status associated with the utilization of at least one resource, display, in real-time, the current status on the virtual display, and analyze consumption of the at least one resource. The processor may be further configured to display actions to reduce the utilization of the at least one resource and provide a predicted status if the displayed actions are taken.

In another embodiment, a sustainability resource management system is described. The salon sustainability resource management system includes one or more backwash stations and a sustainability status unit communicatively coupled to each one or more backwash stations. The sustainability status unit is configured to generate a virtual display including one or more instances of a predicted sustainability status associated with a utilization of at least one resource and illuminate a lighted display based at least in part on a current status of the utilization of at least one resource. The salon sustainability resource management system also includes an integrated verdant unit configured to predict a wholistic sustainability status associated with the current sustainability status at the sustainability status unit associated with each backwash station. An enticement unit is communicatively coupled to the integrated verdant unit, the enticement unit configured to activate one or more appraisals associated with the resource utilization. The salon sustainability resource management system also includes a resource curation unit communicatively coupled to the integrated verdant unit, the resource curation unit configured to reduce consumption of one or more resources.

In an aspect, the resource curation unit may further includes at least one filter system configured to cleanse water to reduce the consumption of at least one resource within the system. The resource curation unit may further include at least one diversion system configured to divert water from a water collection device to the at least one filter system. In an aspect, the enticement unit may include a plaudit unit configured to generate one or more bounties based on positive appraisal from the enticement unit. In another aspect, the enticement unit may include an ecological unit configured to accumulate kudos when the sustainability unit detects behavior reducing the utilization of the at least one resource. In another aspect, the sustainability status unit may include at least one sensor configured to sense one or more characteristics of water proximate each one or more backwash stations. In some embodiments, a processor may be in communication with the sensor for processing signals from the sensor and predicting a sustainability status of at least one resource associated with the use of the water at each of the one or more backwash stations. The processor may also generate one or more bounties based on positive appraisal associated with the overall sustainability status for the multiple backwash stations. In some embodiments, a lighted display may illuminate based at least in part on a current status of the utilization of at least one resource at a single backwash station. In some embodiments, behavior reducing the utilization of the at least one resource for the multiple backwash stations may be detected and kudos may be accumulated when behavior reducing the utilization of the at least one resource is detected.

In another embodiment, a method of managing at least one resource including is described. The method may include detecting one or more instances of a utilization of the at least one resource at a backwash station, processing the one or more instances to predict a sustainability status associated with the utilization of the at least one resource, visually providing feedback to a user to achieve a desired sustainability rating based at least in part on the predicted sustainability status, transmitting the predicted sustainability status to a remote server, receiving an overall sustainability status for multiple backwash stations, and activating one or more appraisals associated with the overall sustainability status for the multiple backwash stations.

In some aspects, the method further including tracking at least one of water and energy usage from each backwash station and determining a change in the at least one of water and energy usage for the multiple backwash stations. The method may also forecast a predicted sustainability status for the multiple backwash stations based at least in part on the determining. In some embodiments, the method may include illuminating a lighted display based at least in part on a predicted status of the utilization of at least one resource for the multiple backwash stations.

DESCRIPTION OF THE DRAWINGS

The foregoing aspects and advantages of the inventive technology will become more readily appreciated as the same become better understood by reference to the following detailed description, when taken in conjunction with the accompanying drawings, wherein.

DETAILED DESCRIPTION

Generally, client's receive numerous treatments at a salon requiring the use of a backwash station. These treatments can include anything from a wash and condition of hair, to scalp treatments, to color or conditioning treatments, to perms or straightening solutions, and the like. Salon personnel typically rinse and clean treatments from client's hair in a backwash station until the water runs clear or suds stop appearing in the rinse water. However, clear water does not always indicate cleanliness and completion of a rinse or treatment. In some situations, the treatment is clear, or it does not produce suds or foam when rinsed. In some situations, personnel may over rinse using an excessive amount of water. Excessive rinsing wastes time when the personnel spend unrequired time rinsing a client.

Additionally, the water temperature at the backwash station is not always precise. the temperature of the water can vary based on the salon personnel preferences, the fixture at the sink, and the client's preferences. This can lead to use of overheated water necessary for comfort or treatment. Over time, this water use can accumulate in the form of water waste and energy waste.

Briefly described, in some embodiments of the present disclosure, a sustainability resource management system is coupled to a sink, for example, proximate a drain to analyze water exhaust from a backwash system, among other characteristics. In operation, a hairdresser utilizes the backwash station to rinse treatments from a client's hair or to cleanse the client's hair, or otherwise treat the client's scalp. A sustainability resource management system is in-line with the sink's exhaust system and is configured to analyze the water passing through the drain to determine several characteristics of the water and/or the salon as a whole. In one embodiment, the sustainability resource management system analyzes the water exiting the sink and alerts the hairdresser when water free of chemicals or treatments is passing therethrough. As a result, the hairdresser is reassured that the client's hair or scalp is clean and can cease rinsing or cleaning the client's hair and continue to the next step, either a next treatment or completing the process at the backwash station.

In some embodiments, a sustainability status unit can be positioned in the drain or water exhaust of a sink to track water characteristics in real time. In some embodiments, the sustainability status unit is configured to detect water characteristics such as water flow and temperature, conductivity, turbidity, pH, and the like. For example, various sensors may be proximate the sustainability status unit that gather data on the waste water as it exits the sink. This data may be analyzed to determine one or more characteristics of the water.

In some embodiments, the sustainability status unit may be configured to indicate to personnel when wastewater is clean, such as at the end of a rinsing cycle. In that regard, the sustainability status unit may include a visual indicator such as a light, a screen, or, in some embodiments, it may include an audible indicator such as a tone or alarm. In some embodiments, the water tracker may connect to a personal device and provide a push notification such as an alert or a vibration. In further embodiments, the sustainability status unit may include a suitable fixture that connects to the faucet and is configured to remotely shut off the water when the wastewater is clean.

In some embodiments, the water characteristics detected by the water tracker may be transmitted to a learning device on a remote computing device or server. The collection of water data may be mined to determine a series of analytical water characteristics. For example, the learning device may utilize a machine learning algorithm to determine water consumption, water saved, energy saved, chemical compounds present, a type of routine used, and the like. The data may provide information to the user on how to increase efficient salon behavior to improve salon sustainability. In some embodiments, the data may be used to determine and categorize products as sustainable. For example, the data may detect the product being used and determine a rinsing time for the product. The overall rinsing time combined with other product information may provide detailed information on which products provide the best results both in terms of quality and sustainability.

In some embodiments, the various detected water characteristics may be used to provide a sustainability rating for each salon or group of salons. The sustainability rating might be a weighted rating of the water characteristics. The water data and the sustainability may provide a benchmark for each salon and generate a list of potential improvements for efficiency. In some embodiments, the salon may have a dashboard that manages and trades sustainability credits. The dashboard may comprise an application on a tablet, a physical display, or a virtual display. In some embodiments, the salon may post their sustainability goals, ratings, and good behavior accolades on the dashboard.

In some embodiments, the salon may be equipped with a resource curation unit to clean wastewater. Filtering water from the backwash drain may allow a salon to reuse at least a portion of the wastewater and reduce overall salon water usage. Additionally, the recycled water may have a raised temperature and therefore not require as much energy to reach an acceptable client temperature. Additionally, recycling clean water enables the salon to reduce its water waste and reduce water cost.

Figure 1:
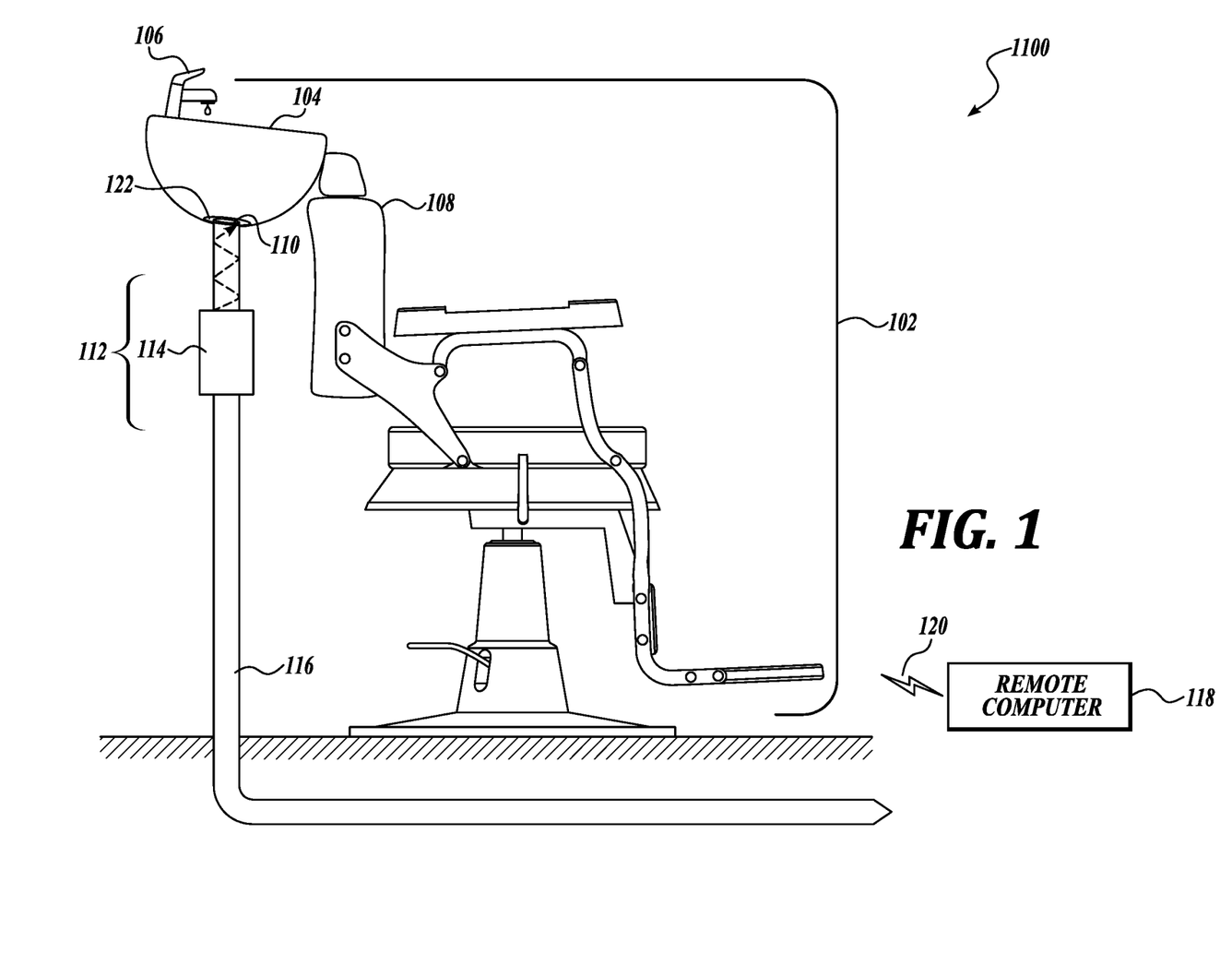
FIG. 1 is a schematic diagram of an exemplary backwash station in accordance with the inventive technology.

FIG. 1 is a schematic diagram of a salon washing system 1100 in accordance with an exemplary embodiment of the inventive technology. In some embodiments, the washing station 1000 includes a backwash station 102 with a sink 104, a water inlet or a faucet 106, a chair 108, and a drain 110. During normal operation, personnel wash or otherwise treat a client's hair in the sink 104. The personnel use water from the faucet 106 to wet, rinse, or otherwise treat the hair or the scalp. The sink 104, which can be any type of basin, captures the water and any other chemicals or treatments and empties into the drain 110. During traditional operating conditions, the wastewater empties into the sewage line 116.

In some embodiments, a sustainability resource management system 112 may include a sustainability status unit 114 positioned in the drain line 116. For example, in some embodiments, a portion of the drain line 116 may be fitted with the sustainability status unit 114. In other embodiments, the sustainability status unit 114 may plug into the drain line 116 by threading into a drain 110 and connecting to the sewage line 116. The location of the sustainability status unit 114 in the drain line 116 may enable the sustainability status unit 114 to analyze wastewater exiting the sink 104.

For example, in some embodiments, the sustainability status unit 114 may be equipped with one or more sensors to detect water characteristics. The sustainability status unit 114 may analyze the detected water characteristics to determine a quality of the water. For example, the sustainability status unit 114 may include any combination of a thermometer, conductivity sensor, nephelometer, turbidimeter, turbidity sensor, pH meter, flow meter, and the like. In some embodiments, these sensors may measure water flow, water temperature, conductivity, turbidity, pH of the water, chemical composition of the water, and the like. These characteristics, either individually or in some combination thereof, may be indicative of the cleanliness of the water.

For example, the conductivity of the water is a measurement of the water's ability to pass electrical flow. This electrical ability is directly related to the makeup of the water, precisely, the total concentration of ions in the water. A higher concentration of ions in the water will result in a higher conductivity reading of the water. The conductive ions come from dissolved salts and inorganic materials such as alkalis, chlorides, sulfides, and carbonate compounds that can all be found in various hair treatment compositions. However, total conductivity cannot be measured in isolation. The conductivity of the water is related to the temperature of the water. As the temperature of the water increases, so will the temperature of the molecules or ions in the water. This will increase the conductivity of the water. Therefore, the overall cleanliness of the water may be defined as a combination of the conductivity reading and the temperature of the water.

In some embodiments, the turbidity of the water is measured using a nephelometer or a turbidimeter. Turbidity is typically measured in Nephelometric Turbity Units ("NTU"). Turbidity measures the cloudiness, or opaqueness of water which is indicative of suspended particles in the water. The sensors measure turbidity by directing a beam of light passing through the water and measuring the intensity of light scattered at 90 degrees from the beam of light. The higher the turbidity rating, the more sediment and particulates are suspended in the water. The suspended particles scatter the light, increasing the turbidity rating. In some embodiments, the turbidity rating can estimate a Total Suspended Solids ("TTS") concentration of the water. Therefore, the overall cleanliness of the water may also be defined by the turbidity rating.

In some embodiments, the pH of the water is measured to determine the activity of the hydrogen ion (H+) present in the water. Generally, water with a low pH reading, under seven (7), is considered acidic and water with a high pH reading, over seven (7), is considered basic. Standard tap water pH readings can range from approximately 6.5 to 8.5 on the pH scale. Shampoos and conditioners tend to run more acidic, ranging from 3-6 on the pH scale. Other products such as straighteners and hair dye may have a pH ranging from 8-10 for straightening products. The overall pH reading of the water may indicate a presence of one or more of these products in the water and therefore the overall cleanliness of the water.

In some embodiments, the water flow is measured with a flow meter or a flow sensor. The flow meter may determine flow measured as the mass flow or the total volume of flow. For some water characteristics, the water flow may calculate into the overall clarity of the water. For example, fast flowing water may affect the turbidity rating and may need to factor into an overall turbidity reading. Water flow may also be indicative of the amount of water the personnel is using. In some embodiments, the personnel may be using too low or too high of water flow. The water flow may contribute to the either the speed with which the product is rinsed or the amount of water that is wasted.

In some embodiments, the sustainability resource management system 112, the sustainability status unit 114, or both may include data transfer capabilities. For example, the sustainability resource management system 112, the sustainability status unit 114, or both may connect to one or more remote computers 118 via one or more communication links 120. The remote computers 118 may be local or may be computers, servers, data banks, some combination thereof, or the like at a remote location. The sustainability resource management system 112, the sustainability status unit 114, or both may communicate locally or remotely with the remote computers 118 to transfer water characteristics and water usage data associated with the salon.

In some embodiments, the sustainability status unit 114 may alert the personnel when the water characteristics meet a predetermined threshold. This may indicate the water is clean, or free of any products the personnel may be applying to the client's hair. While some products, such as shampoos, may create a sudsy residue, other products may leave no residue. The clean water alert may enable the personnel to confidently determine the product is rinsed from the client's hair.

In some embodiments, the sustainability status unit 114 may have an element configured to indicate a status of the water. For example, a drain alert 122 may be proximate the drain of the sink 104 and indicate to the personnel when the water is clean. The drain alert 122 may be a visual alert which may change colors depending on the cleanliness of the waste water. For example, a green indicator light may indicate clean water and a red indicator light may indicate dirty water. In other embodiments, the washing station 1100 may be equipped with a screen able to display text messages to the personnel indicating the cleanliness of the water. In still further embodiments, the sustainability resource management system 112, the sustainability status unit 114, or both may connect to a smart device belonging to the personnel. In alternative embodiments, the alert may include an audible component in lieu of or in addition to the visual indicator. The tone of the audible component may indicate when the water has reached a desirable cleanliness reading.

Figure 2:
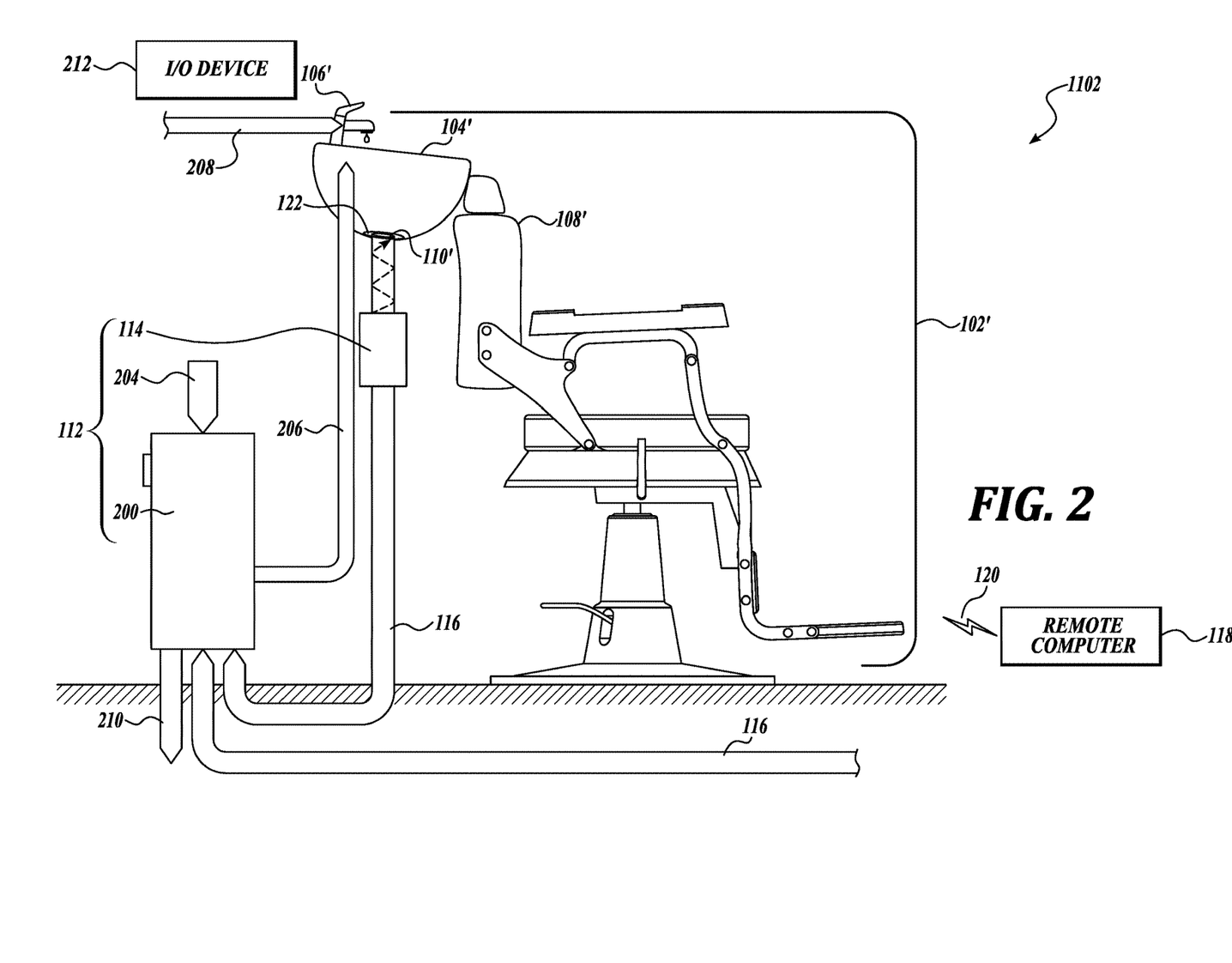
FIG. 2 is a schematic diagram of another exemplary backwash station in accordance with the inventive technology.

FIG. 2 shows an alternative embodiment of a washing system 1102 formed in accordance with exemplary aspects of the inventive technology. The washing system 1102 has components that are the same or substantially similar to the washing system 1100 described above with respect to FIG. 1. Accordingly, for ease of reference, similar parts are labeled with the same part number, except with a prime (').

As shown in FIG. 2, the washing system 1102 differs from the washing system 1100 described above in that the sustainability resource management system 112' is additionally equipped with a resource curation unit 200. For example, in some embodiments, the drain 110' of the backwash station 102' is diverted partially or entirely into the resource curation unit 200. The resource curation unit 200 may have one or more filters to capture the particles and other items suspended in the water that are remnants from the treatments applied to the client's hair. In some embodiments, the resource curation unit 200 may have specific filters for the different chemicals and compounds based on size and other characteristics.

In some embodiments, the resource curation unit 200 may be connected to multiple drain lines 116' when multiple backwash stations 102' are present. The resource curation unit 200 may trigger a recycling sequence based at least in part on water quality feedback from the individual washing stations 102'. For example, each sustainability status unit 114' may be equipped with a communications module. The communications module of the sustainability status unit 114' may link to a communications module in the resource curation unit 200. The resource curation unit 200 may activate a recycling sequence based at least in part on several thresholds of water quality communicated to the resource curation unit 200 from the sustainability status unit 114'. In other embodiments, the resource curation unit 200 may always recycle any water running through the drain line 116'.

In some embodiments, the resource curation unit 200 may also clean and/or purify wastewater for use in the backwash system 102'. For example, the resource curation unit 200 may be equipped with mycobacterial filter, a nanoparticle filter, a UV or UVC light or filter, disinfectant, or some combination thereof. The resource curation unit 200 may measure the cleanliness of the water after treatment and determine if the water quality meets a cleanliness threshold to be recycled. If the water meets or exceeds the threshold, the water may be recycled by being returned to the faucet 106' via one or more piping systems 206.

Combining the recycled water, which may be raised in temperature, reduces overall water usage of the salon and also may reduce energy needed to heat cold, unrecycled water. More specifically, in some embodiments, the filtered, warm water may combine with hot and cold water delivered to the faucet 106'. In other embodiments, general hot water may be piped into the resource curation unit through a main hot water line 204, and the resource curation unit 200 may combine the general hot water with the filtered water. As a result, a single stream of hot water may be delivered to the faucet 106'. Cold water may also be delivered directly to the faucet via a cold water line 208. Combining the filtered water with the main hot water line 204 may enable easier install of the system and also better control of the final temperature at the faucet 106'.

In some embodiments, if a faucet 106' is not turned on and water demand is stopped, the resource curation unit 200 may have a holding tank of filtered water ready to input back into the backwash station 102' via the faucet 106'. In other embodiments, if the faucet 102' is not in use and the water is stopped, the resource curation unit 200 may drain the wastewater to a sewage line 210. This drainage of wastewater may occur before and/or after the water has been filtered and cleaned. For example, the resource curation unit 200 may always run all wastewater from the drain lines 116' through the filters. If there is no hot water demand, the resource curation unit 200, in some embodiments, may drain some or all the filtered water into the sewage drain 210. In some embodiments, if there is no hot water demand, the resource curation unit 200 may store some or all the clean, recycled water in a holding tank. If the holding tank exceeds capacity, any overflow may be released into the sewage line 210.

In other embodiments, if there is no hot water demand, the resource curation unit 200 may directly route waste water into the sewage line 210. In other words, the drain 110' of the backwash station 102' could be diverted entirely to the sewage line 210 when there is no hot water demand. Diverting the wastewater would prevent the wastewater from running through the filters and cleaning process. This may extend the life of the filters and resource curation unit 200 by preventing wastewater from being cleaned prior to being disposed.

In some embodiments, each backwash station 102' may include an input/output device (I/O device) 212. This I/O device 212 may enable personnel to enter in identifying credentials and track the water consumption and sustainability of the personnel. The personnel may also be able to input which products are being used which can correlate to the sustainability status unit 114' and the resource curation unit 200. For example, the sustainability status unit 114' and/or the resource curation unit 200 may learn which characteristics may be detectable in the water based on the type of products being used. This may lead the resource curation unit 200 to uniquely treat the waste water for the specific product. In some embodiments, product information correlated with water characteristics and filtration requirements may develop a database of knowledge. The I/O device 212 may be a tablet, personal computer, or other I/O device with a screen and either a touchscreen or other input device such as a keyboard or audible control. The I/O device 212 may be wired or wirelessly connected to resource curation unit 200, and in some embodiments, the sustainability status unit 114'.

In some embodiments, the overall sustainability of the salon may be quantified. For example, the sustainability resource management system 112 may include an enticement unit 302 as discussed with reference to FIG. 3. The salon owner may input bill information (e.g., water usage bill, a wastewater bill, and an energy bill, such as gas, electric, oil or the like) into the enticement unit 302. These combined data points may be formulated to a grading system to quantify how efficient and sustainable the salon is performing. In some embodiments, the enticement unit 302 may quantify on a granular level and provide an appraisal associated with the one or more resources. In some embodiments, the enticement unit 302 may provide each personnel a rating. In some embodiments, the ratings may be gamified and salons and/or personnel may compete with each other for the best rating. In other embodiments, the ratings may equate to achievements or certifications. For example, ratings may be linked to ranking standards such as "Gold," "Silver," "Bronze," and the like. In some embodiments, the water and energy savings may be measured monetarily. For example, the salon may see a reduction in costs relating to a water usage bill, a wastewater bill, and/or an energy bill or the like by reusing filtered water.

Figure 3:
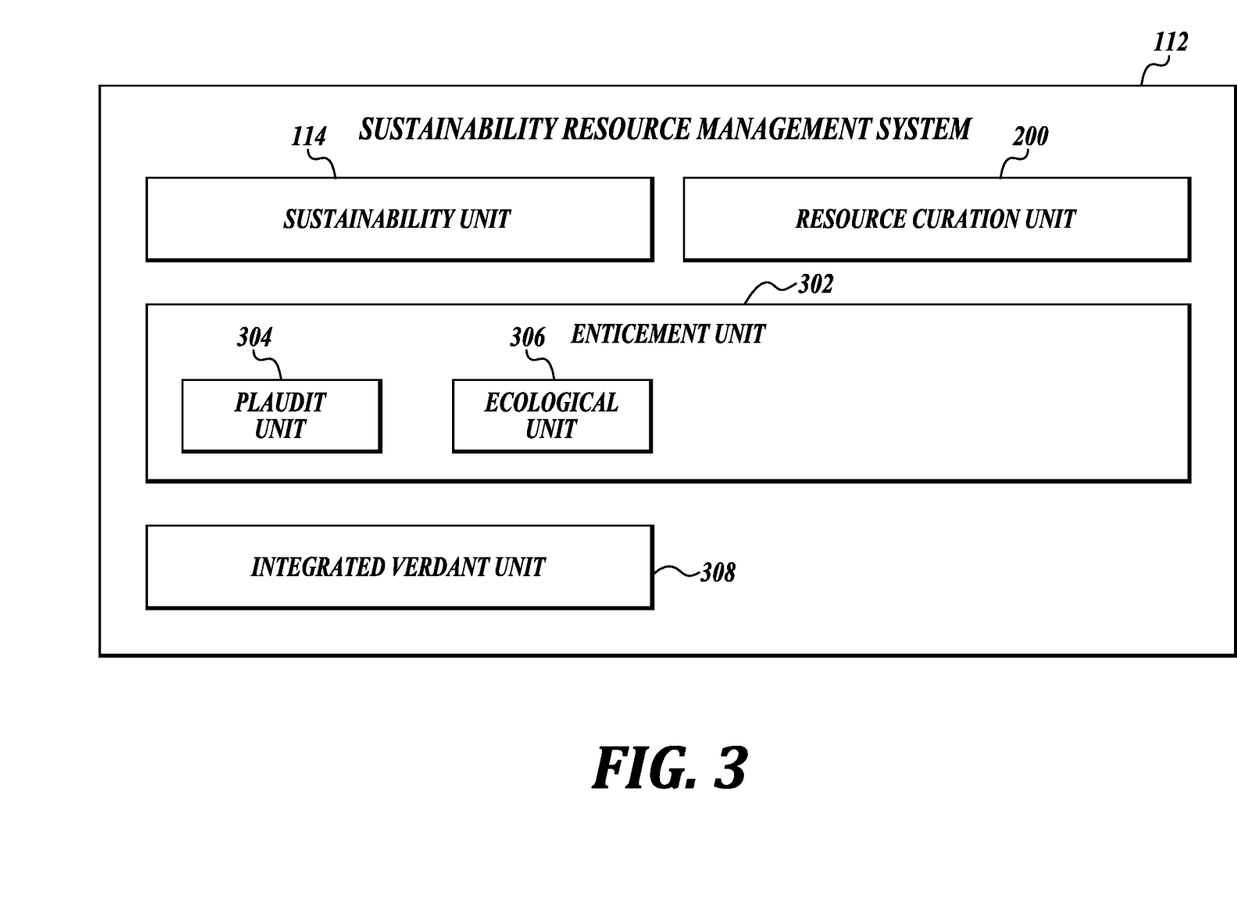
FIG. 3 is a schematic diagram of an exemplary sustainability resource management system in accordance with the inventive technology.

FIG. 3 is an example of a sustainability resource management system 112. The sustainability resource management system 112 may be an example of the sustainability management system 112 described with reference to FIGS. 1 and 2. In some embodiments, the sustainability resource management system 112 may include the sustainability resource status unit 114 described with reference to FIGS. 1 and 2. In still further embodiments, the sustainability resource management system 112 may also include a resource curation unit 200 as described with reference to FIG. 2. In still further embodiments, the sustainability resource management system 112 may also include an enticement unit 302. In still further embodiments, the sustainability resource management system 112 may include an integrated verdant unit 308.

In some embodiments, the sustainability status unit 114 may generate a virtual display including one or more instances of a predicted sustainability status associated with the utilization of at least one resource. For example, the sustainability status unit 114 may measure resource usage such as water usage, energy usage, time usage, and the like. The sustainability status unit 114 may use empirical data gathered from the salon to predict the salon's sustainability status. The sustainability status may correlate to low water and energy usage, or a reduction in resource usage as a whole. In some embodiments, the sustainability status may have a such as "Gold," "Silver," "Bronze," and the like.

In some embodiments, the resource curation unit 200 may be configured to reduce consumption of one or more resources. For example, the resource curation unit 200 may reduce consumption of water, energy, or both. The resource curation unit 200 may couple to a backwash station and cleanse water otherwise headed for a sewage treatment plant. By cleansing the water from both dirt, particulates, and sanitizing the water, the wastewater can then be reused either on the same client or on different clients. This prevents the use of fresh water from the tap. Additionally, since the now sanitized water has already been heated prior to use, the water should retain a relative amount of heat and not require as much energy to heat to preferred standards.

In still further embodiments, the sustainability resource management system 112 may include an enticement unit 302. The enticement unit 302 may be configured to activate one or more appraisals associated with resource utilization. For example, the enticement unit 302 may motivate the salon, or personnel within the salon, to reduce their overall resource consumption. The goal may be to compete amongst salon personnel, amongst neighboring salons, to achieve a sustainability status, or some other target.

If the resource utilization of at least one resource meets or exceeds a threshold, the salon, personnel, or both may receive an appraisal. For example, the enticement unit 302 may include a plaudit unit 304. The plaudit unit 304 may be configured to generate one or more bounties based on positive appraisal from the enticement unit 302. The bounties may include a status or kudos in a competition, or may include rewards such as free products, product samples, advertising, or any benefit or appraisal that has a perceived value to the salon and its personnel. For example, personnel may receive an extra vacation day, or a free treatment, or a coffee or pizza party, or some value add.

In some embodiments, the amount of appraisals received may be connected to an ecological unit 306. For example, the ecological unit 306 may be configured to accumulate kudos when the sustainability unit 114 detects behavior reducing the utilization of the at least one resource. For example, the ecological unit 306 may detect a reduction in water usage wherein the personnel is able to quickly rinse a client's hair and shut off the water. The ecological unit 306 may also detect a lower water temperature being used, which may result in a cost and energy savings. In some embodiments, the ecological unit 306 may detect when water is being recycled, which results in reduced use of multiple resources.

In some embodiments, the integrated verdant unit 308 may predict a wholistic sustainability status associated with each backwash station. For example, each backwash station in a salon may have its own sustainability rating. The integrated verdant unit 308 may then calculate the rating of each backwash station to provide an overall sustainability status of either the salon, personnel, or each backwash station. The integrated verdant unit may then track either each backwash station or each personnel to determine an overall green rating of each. In some embodiments, the rating may contribute to competitions or rankings within the salon or between different salons. In some embodiments, the ratings and rankings may be displayed to encourage and elicit green behavior from clients. In some embodiments, the integrated verdant unit 308 may be a local machine or may be a part of or in communication with a remote computer (i.e. remote computer 118). The remote computer may be used to calculate a total predicted sustainability status for each backwash station, the salon as a whole, or both and provide the score back to the salon.

Figure 4:
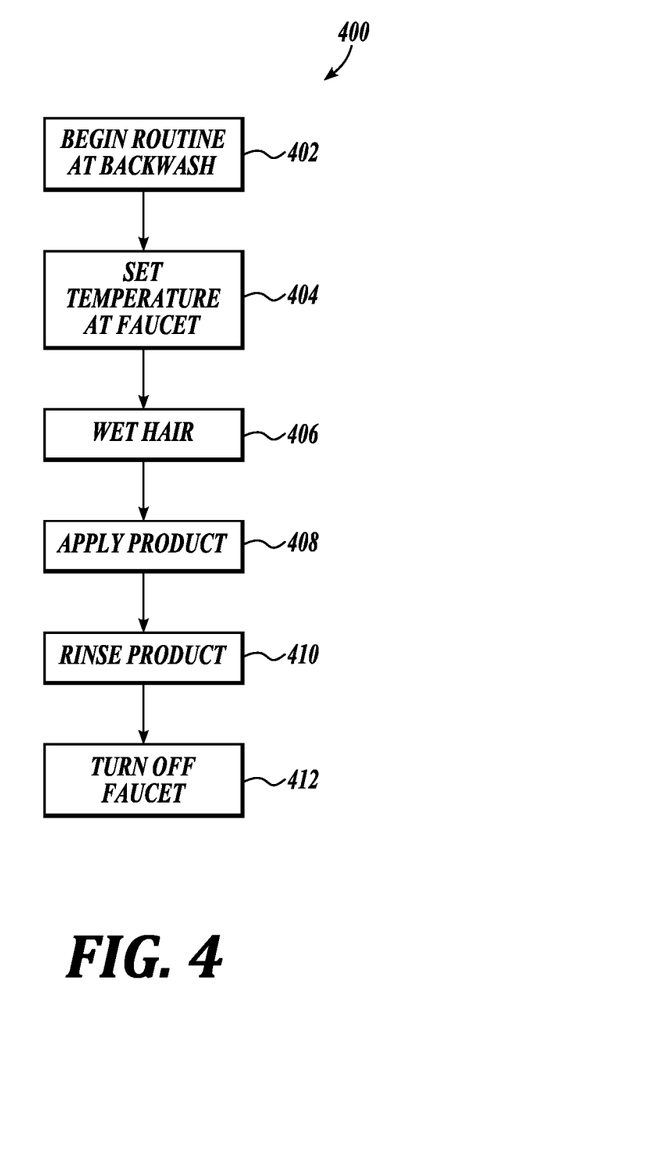
FIG. 4 is a flow diagram for a method of cleaning a client's hair in accordance with the inventive technology.

Turning now to FIG. 4, a representative method 400 of a backwash cycle is shown. The method 400 may use either backwash station 102 or 102' shown in FIG. 1 or 2. In some embodiments, the method 400 may additionally use the sustainability status units 114, or 114' described above with reference to FIGS. 1 and 2 and/or the resource curation unit 200 described with reference to FIG. 2.

At block 402, the method 400 may include beginning the routine at the backwash station. The routine may include seating a client into the chair. In other embodiments, the routine may also include turning on a faucet at the backwash station. In still further embodiments, the routine may begin when the personnel enters identifying information at the backwash. The identifying information may uniquely identify the personnel, the backwash station, or in some embodiments, product information.

At block 404, the method 400 may include setting the water temperature at the faucet. This may include temperature adjustments for client preference or as required by the products. Once the temperature is set, at block 406, the method may include wetting the client's hair. Once the client's hair is sufficiently wet, at block 408, the method 400 may include applying a product to the client's hair. The product may include one or a combination of shampoo, conditioner, color dye, straightening products, perming products, or the like. In some embodiments, the method 400 may interchange the steps at block 406 and block 408. For example, some products may require the personnel to wet the client's hair before applying the product, while in other instances; the product may require dry hair. Once the treatment has been applied for the desired time frame, at block 410, the method 400 may include rinsing product from the client's hair. If the process is complete, at block 412, the method 400 may include shutting off the faucet.

Figure 5:
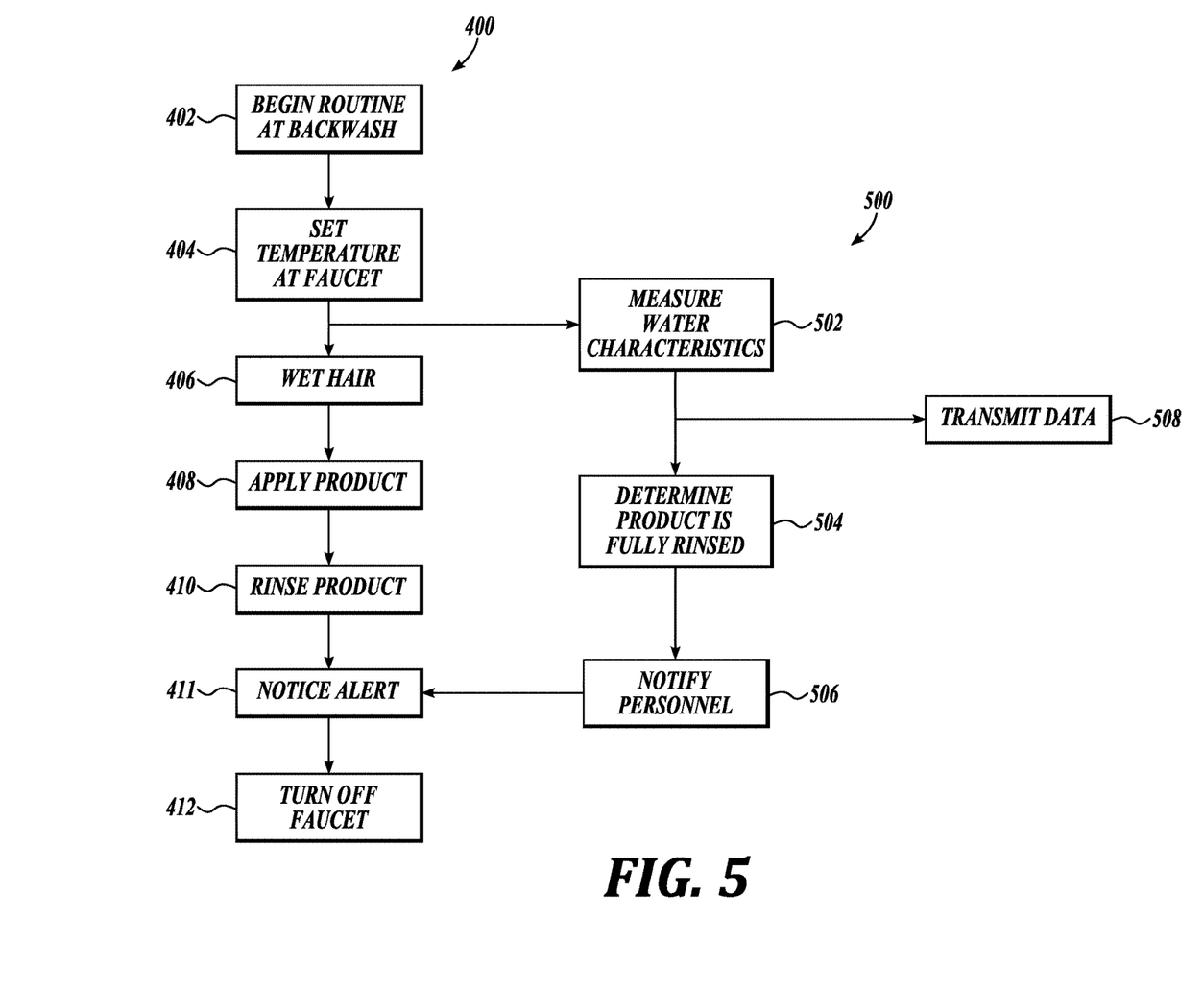
FIG. 5 is a flow diagram for a method of detecting clean water in accordance with the inventive technology.

Turning now to FIG. 5, a representative method 500 of a backwash cycle with a sustainability status unit is shown. The method 500 is shown incorporating aspects of method 400 to display how the two methods interact with each other.

The method 500 may use backwash station 102 and the sustainability resource management system 112 shown in either FIG. 1 or 2.

At block 502, after water has started running at block 404, the method 500 may include measuring water characteristics. For example, as the water exits the sink, the sustainability status unit may begin to analyze various water characteristics. The water characteristics may include water temperature, water flow, pH meter, turbidity, conductivity, and the like. Each measured characteristic may have a threshold. Once a threshold is exceeded for each characteristic, the water may be deemed cleaned. In other embodiments, the sustainability status unit may measure for sudden changes in water characteristics.

Once a predetermined threshold has been satisfied, at block 504, the method 500 may include determining that the product is fully rinsed. For example, once a product has been rinsed out, the water characteristics may suddenly change. This may indicate the product is fully rinsed.

When a sudden change is detected, either from clean to dirty or dirty to clean, at block 506, the personnel may be notified. In some embodiments, an indicator light may illuminate. The indicator light may be proximate the sink such as near the drain, faucet, or other visible location. In further embodiments, an audible alarm may alternatively or additionally alert the personnel. In still further embodiments, the sustainability status unit may connect to a mobile device and alert the mobile device.

At block 411, the method 400 may include noticing the alert. For example, the personnel may notice an alert indicating water cleanliness. The alert may indicate a sudden change in water cleanliness or that the wastewater is free of contaminants. Noticing the alert may trigger the personnel to continue to block 412, where the method 400 includes turning off the faucet.

Once the method 500 is used to begin measuring water characteristics, at block 502, the method 500 may include transmitting the water characteristic data to a remote device at block 508. The remote device may be a local computer, a remote computer, server, or the like. The method 500 may include continuously or intermittently transmitting water characteristic data.

Figure 6:
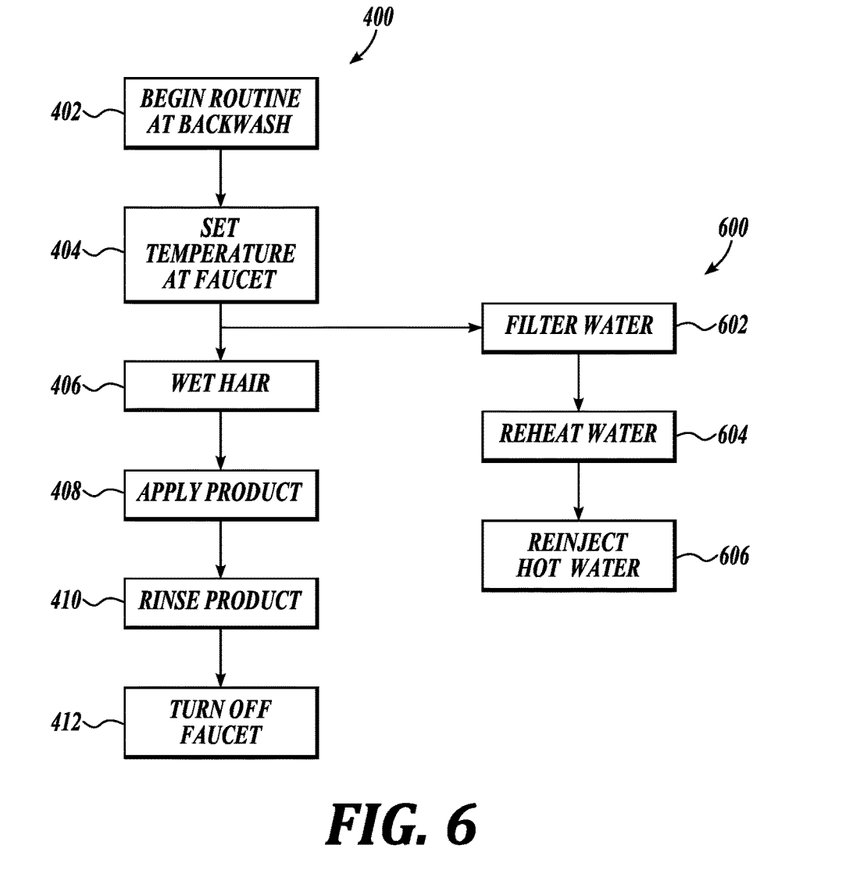
FIG. 6 is a flow diagram for a method of detecting clean water in accordance with the inventive technology.

Turning now to FIG. 6, a representative method 600 of a backwash cycle with a resource curation unit is shown. The method 600 is shown incorporating aspects of method 400 to display how various steps of the two methods 400, 600 may be interdependent on each other. The method 600 may use backwash station 102' and the resource curation unit 200 described with reference to FIG. 2.

At block 602, the method 600 may include filtering the water coming from the backwash drain. For example, a microfilter, nanofilter, or both may be positioned in a resource curation unit to clean the backwash water. The method 600 may also include treating the backwash water with a UV lamp to kill any bacteria which may be present in the water.

At block 604, the method 600 may include reheating lukewarm filtered water from the backwash system. In some embodiments, the water may be heated by a heating element in the resource curation unit. In another embodiment, the water may be heated by combining it with hot water to reach a desired temperature.

At block 606, the method 600 may include reinjecting the water into the hot water plumbing of the washing system. For example, the resource curation unit may couple to the hot water inlet for the faucet. In some embodiments, the resource curation unit may couple to the hot water inlet line that provides hot water to a bank of backwash stations. In other embodiments, the resource curation unit may couple to individual backwash stations.

The method shown and described with respect to FIG. 6 may be combined with the method shown and described with respect to FIG. 5.

Figure 7:
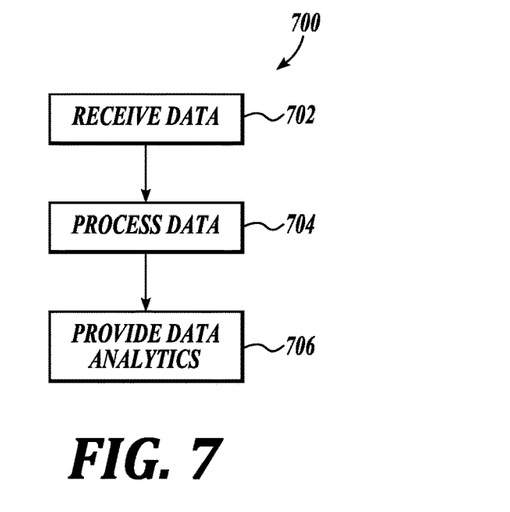
FIG. 7 is a flow diagram for a method of detecting clean water in accordance with the inventive technology.

Turning now to FIG. 7, a representative method 700 of analyzing water characteristics is shown. The method 700 may use the backwash station 102 or 102' described above with reference to FIG. 1 or 2.

At block 702, the method 700 may include receiving the data from the sustainability status unit and, in some embodiments, the resource curation unit. The data may include salon information and water characteristic data detected by the sustainability status unit. The data may also include recycling water statistics and energy saving information from the resource curation unit. In some embodiments, the method 700 may also include receiving energy and water usage data from the salon. Such data may include information such as an amount of water consumed within a specific time frame, energy information related to heating the water, etc. For example, the energy information may be electric, gas, or oil or another source depending on the type of hot water installed at the salon. In some embodiments, the method 700 may also receive personnel identification information coupled to water statistics. In further embodiments, the method 700 may include receiving product information.

At block 704, the method 700 may include analyzing the data. Analyzing the data may include tracking the water characteristics to gather more information on how various products react with the water or affect the water. In some embodiments, the data may be analyzed to determine and track one or more of: water consumption, water saved, energy saved, type of routine, chemical compounds, sustainability rating, and salon benchmarks. In some embodiments, the benchmarks may be determined using the sustainability status unit system but without alerting the personnel. For example, the sustainability status unit may track water characteristics for a predetermined sampling period. This may provide a base level understanding of the water usage at washing stations and what routines are generating higher water waste.

At block 706, the method 700 may include providing data analytics. The data analytics may be provided to salon personnel to track historical usage and savings. This may include baseline information before a water tracking and resource curation unit was installed to provide a before and after look at how the products have increased the sustainability of the salon and reduced waste. This may also correlate to a cost savings the salons can realize. In some embodiments, providing the data analytics may include providing sustainability certifications. The sustainability certifications may include rankings, such as gold, silver, and bronze. This may be information a salon wishes to display to communicate its dedication to sustainability and attract environmentally conscious clientele.

In further embodiments, the data analytics may also be coupled to the enticement unit, the integrated verdant unit, or both. The data analytics may predict and calculate one or more appraisals or kudos associated with a reduced consumption of at least one resource. The data analytics may track empirical data to continue to measure improvement or sustained ecologically friendly practices. The number of appraisals, bounties, kudos, or other benefits may increase the longer a salon achieves thresholds associated with environmentally friendly practices.

In some embodiments, the data analytics may also include comparisons with other salons. The comparisons may be rationalized to provide a direct comparison to other salons, including the number of personnel at each salon, the number of clients seen and treated at each salon, the type of treatments provided, and the like. This may enable larger, busier salons to compare their practices to smaller or more slow-paced salons without detrimenting either for their size or capacity.

Figure 8:
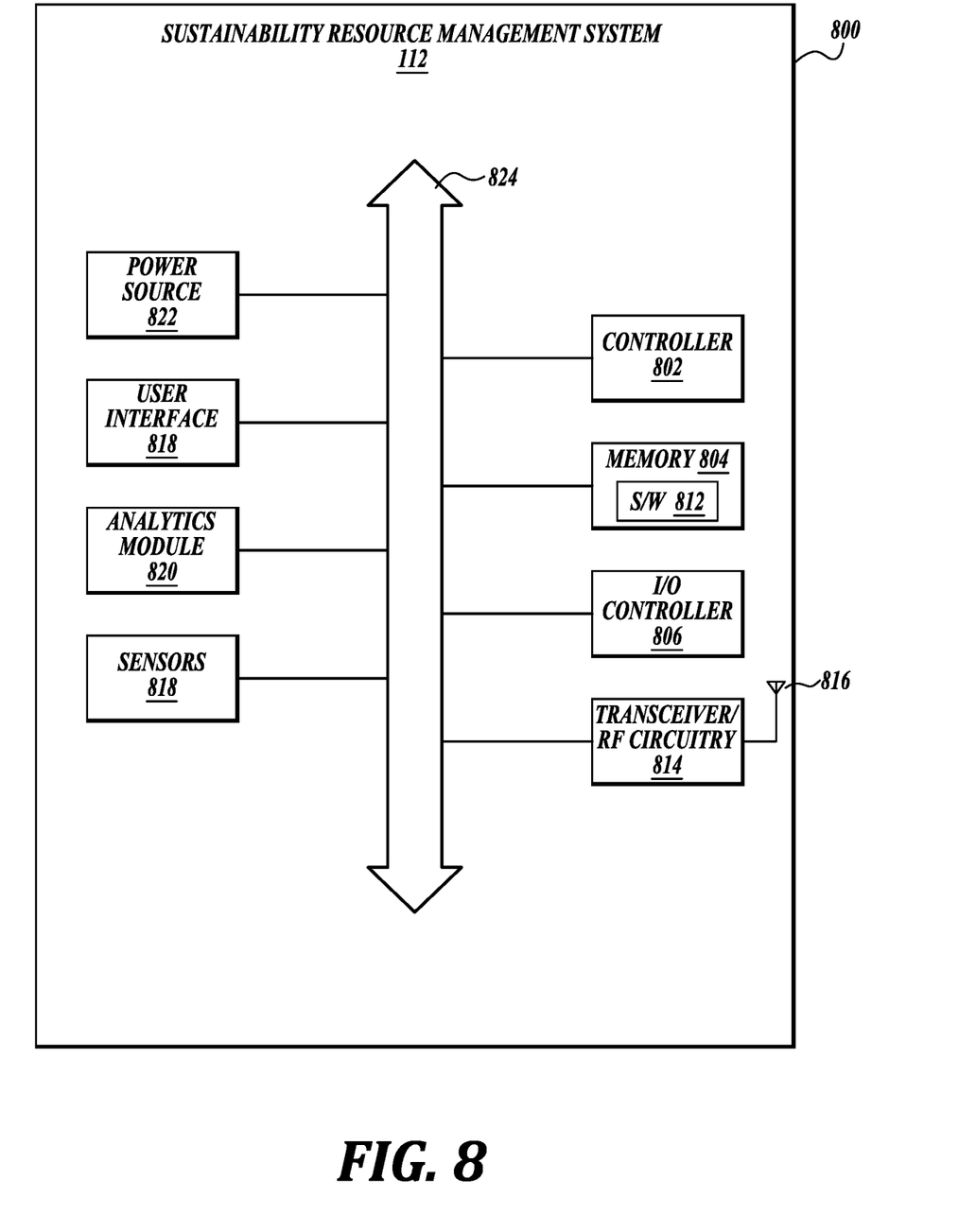
FIG. 8 is a schematic diagram of an exemplary water tracker in accordance with the inventive technology.

FIG. 8 is a diagram displaying various functional components of an exemplary sustainability status unit for use with a backwash system 102, 102', or similar. The sustainability status unit may be an example of the sustainability status unit 112 or 112' described with reference to FIGS. 1 and 2. However, for ease of reference, the sustainability status unit will be labeled with reference numeral 114.

The components of the sustainability status unit 114 shown in FIG. 8 may be contained within a single unit or may be separated amongst two or more units in communication with each other. In some embodiments, the sustainability status unit 114 may include a controller 802, memory 804, I/O controller 806, user interface 808, and the like. In some embodiments, the components are contained within a housing 800 or casing.

The controller 802, memory, 804 (including software/firmware code (SW) 812), input/output controller module 806, user interface module 808, transceiver module 814, and one or more antennas 816 may communicate—directly or indirectly—with one another (e.g., via one or more buses 824). The transceiver module 814 may communicate bi-directionally—via the one or more antennas 816, wired links, and/or wireless links—with remote devices 118 as described previously. The transceiver module 814 may include a modem that may modulate packets and provide the modulated packets to the one or more antennas 816 for transmission, and to demodulate packets received from the one or more antenna 816. While a single antenna 816 is shown, the sustainability status unit 114 may include several antennas 816 which may concurrently transmit and/or receive multiple wired and/or wireless transmissions. In some embodiments, the sustainability status unit 114 may provide a connection using wireless techniques, including digital cellular connection, Cellular Digital Packet Data (CDPD) connection, digital satellite data connection, and/or another connection.

The controller 802 may control one or more operations of the sustainability status unit 114. The controller 802 may include of one or more processors, implemented as a Central Processing Unit (CPU), a digital signal processor, a microprocessor, a microcontroller, an application-specific integrated circuit (ASIC), a programmable logic device (PLD), or other implementation. In some embodiments, the controller 802 may include a single chip combined with memory controller and a peripherals interface.

The memory 804 may be a non-transitory computer-readable storage medium. In some embodiments, the memory 804 may include both persistent/non-volatile and non-persistent/volatile memory components. The memory 804 may include volatile memory, non-volatile memory (NVM), for example RAM, ROM, EEPROM, flash memory, or some combination thereof. The memory 804 may store computer-readable, computer executable software/firmware code 812 that, when executed, may cause the controller 802 to perform various functions as described herein.

In some embodiments, the memory 804 can contain, among other things, the Basic Input-Output system (BIOS) which may control basic hardware and/or software operations such interactions and workings of the various components of the sustainability status unit 114, and in some embodiments, components external to the sustainability status unit 114. For example, the memory 804 may contain various modules to implement the workings of the sustainability status unit 114 and other aspects of the present disclosure.

In some embodiments, the sustainability status unit 114 may include one or more sensors 818. The one or more sensors 818 may include any combination of a thermometer, conductivity sensor, nephelometer, turbidimeter, turbidity sensor, pH meter, flow meter, and the like. In some embodiments, these sensors may measure water flow, water temperature, conductivity, turbidity, pH of the water, chemical composition of the water, and the like. These characteristics, either individually or in some combination thereof, may be indicative of the cleanliness of the water.

The user interface 808 may coordinate communication with the personnel. For example, the user interface 808 may receive inputs from the personnel and may generate outputs to the user. The outputs can be visual, sound, vibrations, lights, images, and so on. The user interface may include one or more individual devices such as a screen, touchscreen, a keypad, an optical finger interface, one or more speakers, one or more microphones, one or more buttons, one or more visual indicators, and so on.

For example, in some embodiments, the sustainability status unit 114 may include an input device for personnel to input data either identifying the personnel, the products being used, or both. Additionally, in some embodiments, the sustainability status unit 114 may indicate to the personnel when the rinse cycle is complete. This may be via a light indicating a completed cycle, through a visual screen, an audible alert, or the like.

The sustainability status unit 114 may also include components for bi-directional data communications including components for transmitting communications and components for receiving communications. For example, the sustainability status unit 114 may communicate bi-directionally with the resource curation unit 200 and/or external devices 118. The bi-directional communication may be direct or indirect.

The analytics module 820 may receive data from the one or more sensors 818 regarding water characteristics. The analytics module 820 may analyze the data to determine when a rinse cycle is complete. Once a rinse cycle is complete, the analytics module 820 may activate the user interface 808 via the I/O controller 806 to alert the personnel that the rinse cycle has been completed. The analytics module 820 may also transfer data to one or more remote devices for further analytics and data tracking. In some embodiments, the analytics module 820 may also communicate with a resource curation unit 200 if one is installed locally.

In some embodiments, the sustainability status unit 114 may include a power source 822. The power source 822 may comprise a battery or battery pack, which may be rechargeable. In some instances, the power source 822 may comprise a series of different batteries to ensure the sustainability status unit 114 has power. For example, the power source 822 may include a series of rechargeable batteries as a prime power source and a series of non-rechargeable batteries as a secondary source. Personnel may have the option of charging the sustainability status unit 114 when the backwash station is not in use, such as when the salon is closed. In further embodiments, the power source 822 may include an AC power source.

Figure 9:
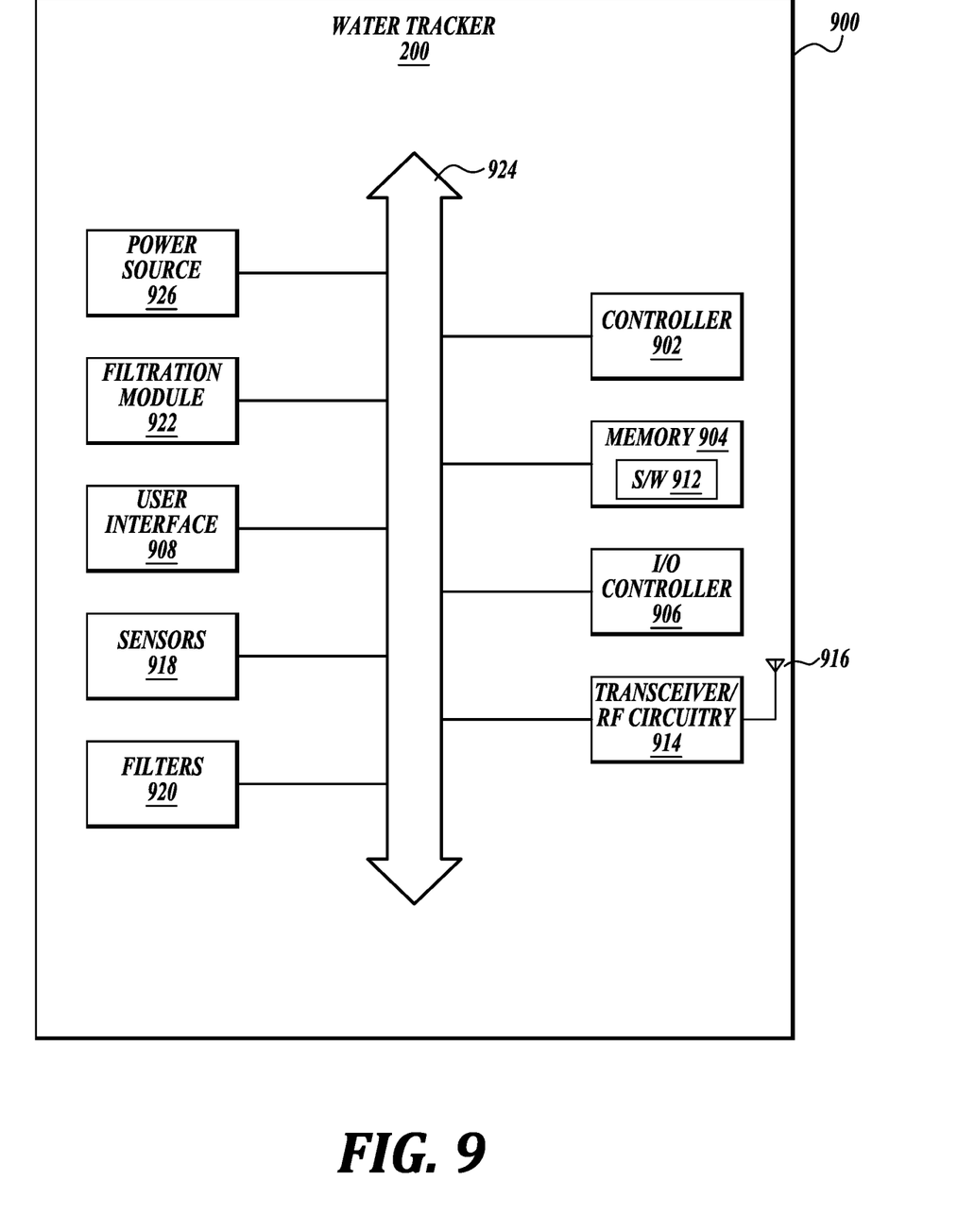
FIG. 9 is a schematic diagram of an exemplary resource curation unit in accordance with the inventive technology.

FIG. 9 is a diagram displaying various functional components of an exemplary resource curation unit 200 for use with a backwash system 102' or similar. The resource curation unit 200 may be an example of the resource curation unit 200 described with reference to FIG. 2. The components shown in FIG. 9 may be contained within a single unit or may be separated amongst two or more units in communication with each other. In some embodiments, the resource curation unit 200 may include a controller 902, memory 904, I/O controller 906, user interface 908, and the like. In some embodiments, the components are contained within a housing 900 or casing.

The controller 902, memory, 904 (including software/firmware code (SW) 912), input/output controller module 906, user interface module 908, transceiver module 914, and one or more antennas 916 may communicate—directly or indirectly—with one another (e.g., via one or more buses 924). The transceiver module 914 may communicate bi-directionally—via the one or more antennas 916, wired links, and/or wireless links—with remote devices 118 as described previously. The transceiver module 914 may include a modem which may modulate packets and provide the modulated packets to the one or more antennas 916 for transmission, and to demodulate packets received from the one or more antennas 916. While a single antenna 916 is shown, the resource curation unit 200 may include several antennas 916 which may concurrently transmit and/or receive multiple wired and/or wireless transmissions. In some embodiments, the resource curation unit 200 may provide a connection using wireless techniques, including digital cellular connection, Cellular Digital Packet Data (CDPD) connection, digital satellite data connection, and/or another connection.

The controller 902 may control one or more operations of the resource curation unit 200. The controller 902 may include of one or more processors, implemented as a Central Processing Unit (CPU), a digital signal processor, a microprocessor, a microcontroller, an application-specific integrated circuit (ASIC), a programmable logic device (PLD), or other implementation. In some embodiments, the controller 902 may include a single chip combined with memory controller and a peripherals interface.

The memory 904 may be a non-transitory computer-readable storage medium. In some embodiments, the memory 904 may include both persistent/non-volatile and non-persistent/volatile memory components. The memory 904 may include volatile memory, non-volatile memory (NVM), for example RAM, ROM, EEPROM, flash memory, or some combination thereof. The memory 904 may store computer-readable, computer executable software/firmware code 912 that, when executed, may cause the controller 902 to perform various functions as described herein.

In some embodiments, the memory 904 can contain, among other things, the Basic Input-Output system (BIOS) which may control basic hardware and/or software operations such interactions and workings of the various components of the resource curation unit 200, and in some embodiments, components external to the resource curation unit 200. For example, the memory 904 may contain various modules to implement the workings of the resource curation unit 200 and other aspects of the present disclosure.

In some embodiments, the resource curation unit 200 may include one or more sensors 918. The one or more sensors 918 may include any combination of a thermometer, conductivity sensor, nephelometer, turbidimeter, turbidity sensor, pH meter, flow meter, and the like. In some embodiments, these sensors 918 may measure water flow, water temperature, conductivity, turbidity, pH of the water, chemical composition of the water, and the like. These characteristics, either individually or in some combination thereof, may be indicative of the cleanliness of the water.

In some embodiments, the resource curation unit 200 may also include one or more filters 920. The filters 920 may include one or more filters to capture the particles and other items suspended in the water that are remnants from the treatments applied to the client's hair. In some embodiments, the filters 920 may be specific for the different chemicals and compounds based on size and other characteristics present in hair products. In some embodiments, the filters 920 may include micro filter, nanofilter, or both. Furthermore, in some embodiments, the filters 920 may include of an activated carbon filter, reverse osmosis filter, alkaline/water ionizer, a UV filter, an infrared filter, or some combination thereof.

The user interface 908 may coordinate communication with the personnel. For example, the user interface 908 may receive inputs from the personnel and may generate outputs to the user. The outputs can be visual, sound, vibrations, lights, images, and so on. The user interface may include one or more individual devices such as a screen, touchscreen, a keypad, an optical finger interface, one or more speakers, one or more microphones, one or more buttons, one or more visual indicators, and so on.

For example, the personnel may have the option of requesting recycled water or not depending upon client conditions. For example, if a client is coming in with a potentially transmittable issue such as head lice, recycled water may not be desired. Additionally, in some embodiments, the resource curation unit 200 may output real time data to the personnel. The data may include estimated water and/or energy savings, alerts on the health of the resource curation unit, and salon certifications.

The resource curation unit 200 may also include components for bi-directional data communications including components for transmitting communications and components for receiving communications. For example, the resource curation unit 200 may communicate bi-directionally with the sustainability status unit 114 and/or external devices 118. The bi-directional communication may be direct or indirect.

The filtration module 922 may cause wastewater to be filtered and cleaned. In some embodiments, the filtration module 922 may divert wastewater to a drain if there is not a hot water demand. In other embodiments, the filtration module 922 may store clean water for later use. The filtration module 922 may test filtered water to ensure the water meets cleanliness standards for recycling. In some embodiments, the filtration module 922 may analyze the data to determine cost and water savings. It may also analyze the data to determine if the filters or other components require replacing. In some embodiments, the filtration module 922 may alert the personnel that recycled water is in use. In further embodiments, the filtration module 922 may also transfer data to one or more remote devices for further analytics and data tracking. In some embodiments, the filtration module 922 may also communicate with a sustainability status unit 114 if one is installed locally.

In some embodiments, the resource curation unit 200 may include a power source 926. The power source 926 may comprise a battery or battery pack, which may be rechargeable. In some instances, the power source 926 may comprise a series of different batteries to ensure the resource curation unit 200 has power. For example, the power source 926 may include a series of rechargeable batteries as a prime power source and a series of non-rechargeable batteries as a secondary source. Personnel may have the option of charging the power source 926 when the backwash station is not in use, such as when the salon is closed. In further embodiments, the power source 926 may include an AC power source.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. Of course, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Where methods are described, the methods may include more, fewer, or other steps. Additionally, steps may be performed in any suitable order. Accordingly, the disclosure can encompass other embodiments not expressly shown or described herein.

For the purposes of the present disclosure, lists of two or more elements of the form, for example, "at least one of A, B, and C," is intended to mean (A), (B), (C), (A and B), (A and C), (B and C), or (A, B, and C), and further includes all similar permutations when any other quantity of elements is listed.

The present disclosure may also reference quantities and numbers. Unless specifically stated, such quantities and numbers are not to be considered restrictive, but exemplary of the possible quantities or numbers associated with the present disclosure. Also in this regard, the present disclosure may use the term "plurality" to reference a quantity or number. In this regard, the term "plurality" is meant to be any number that is more than one, for example, two, three, four, five, etc. In an embodiment, "about," "approximately," etc., means plus or minus 5% of the stated value.

While several embodiments have been illustrated and described, it will be appreciated that various changes can be made therein without departing from the spirit and scope of the inventive technology.

The embodiments of the invention in which an exclusive property or privilege is claimed are defined as follows:

1. A salon sustainability resource management system, comprising:
   one or more backwash stations, each backwash station including a sink, a faucet with a water inlet, a drain, and a sensor coupled to the drain to analyze water exiting the sink;
   a sustainability status unit communicatively coupled to each of the one or more backwash stations, the sustainability status unit configured to generate a virtual display including one or more instances of a current sustainability status associated with a utilization of at least one resource, the sustainability status unit at least indicates a cleanliness of water;
   an enticement unit configured to activate one or more appraisals associated with the resource utilization at the backwash station, wherein an appraisal is activated to provide a motivation to reduce water consumption; and
   an integrated verdant unit configured to predict a wholistic sustainability status associated with the current sustainability status at the sustainability status unit associated with each backwash station.

2. The salon sustainability resource management system of claim 1, further comprising:
   a resource curation unit fluidly coupled to the one or more backwash stations, the resource curation unit configured to reduce consumption of one or more resources.

3. The salon sustainability resource management system of claim 1, wherein the integrated verdant unit includes
   a plaudit unit configured to generate one or more bounties based on positive appraisal from the enticement unit.

4. The sustainability resource management system of claim 1, wherein the integrated verdant unit includes:
   an ecological unit configured to accumulate kudos when the integrated verdant unit detects salon behavior reducing the utilization of the at least one resource.

5. The sustainability resource management system of claim 1, wherein the sustainability status unit is further configured to illuminate a lighted display based at least in part on a current status of the utilization of at least one resource.

6. The sustainability resource management system of claim 1, wherein the sustainability status unit further includes:
   a processor in communication with the sensor for processing signals from the sensor and predicting a sustainability status of at least one resource associated with the use of the water at the backwash station;
   a remote server in communication with the processor to receive the predicted sustainability status associated with the backwash station, the remote server configured to calculate a total predicted sustainability status for multiple backwash stations.

7. The sustainability resource management system of claim 6, wherein the sustainability status unit further includes:
   a light source proximate the backwash station, the light source in communication with the processor; and
   the processor further configured to illuminate the light source a specific color based at least in part on the predicted sustainability status for the backwash station.

8. The sustainability resource management system of claim 6, wherein the remote server communicates the predicted sustainability status for the multiple backwash stations to the virtual display.

9. The sustainability resource management system of claim 6, wherein the processor is further configured to:
   generate a current status associated with the utilization of at least one resource;
   display, in real-time, the current status on the virtual display;
   analyze consumption of the at least one resource;
   display actions to reduce the utilization of the at least one resource; and
   provide a predicted status by taking the displayed actions.

10. A sustainability resource management system, comprising:

one or more backwash stations, each backwash station including a sink, a faucet with a water inlet, a drain, and an analyzer coupled to the drain to analyze water quality;

a sustainability status unit communicatively coupled to each one or more backwash stations, the sustainability status unit configured to generate a virtual display including one or more instances of a predicted sustainability status associated with a utilization of at least one resource and illuminate a lighted display based at least in part on a current status of the utilization of at least one resource, the sustainability status unit at least indicates a cleanliness of water;

an integrated verdant unit configured to predict a wholistic sustainability status associated with the current sustainability status at the sustainability status unit associated with each backwash station, an enticement unit communicatively coupled to the integrated verdant unit, the enticement unit configured to activate one or more appraisals associated with the resource utilization, wherein an appraisal is activated to provide a motivation to reduce water consumption; and a resource curation unit communicatively coupled to the integrated verdant unit, the resource curation unit configured to reduce consumption of one or more resources.

11. The sustainability resource management system of claim 10, wherein the resource curation unit further includes:

at least one filter system configured to cleanse water to reduce the consumption of at least one resource within the system.

12. The sustainability resource management system of claim 11, wherein the resource curation unit further includes:

at least one diversion system configured to divert water from a water collection device to the at least one filter system.

13. The sustainability resource management system of claim 10, wherein the enticement unit includes:

a plaudit unit configured to generate one or more bounties based on positive apprisal from the enticement unit.

14. The sustainability resource management system of claim 10, wherein the enticement unit includes:

an ecological unit configured to accumulate kudos when the sustainability unit detects behavior reducing the utilization of the at least one resource.

15. The sustainability resource management system of claim 10, wherein the sustainability status unit further includes:

a processor in communication with the sensor for processing signals from the sensor and predicting a sustainability status of at least one resource associated with the use of the water at each of the one or more backwash stations.

16. A method of managing at least one resource comprising:

detecting one or more instances of a utilization of the at least one resource at multiple backwash stations, each backwash station including a sink, a faucet with a water inlet, a drain, and a sensor coupled to the drain to analyze water exiting the sink;

processing the one or more instances to predict a sustainability status associated with the utilization of the at least one resource, the sustainability status unit at least indicates a cleanliness of water;

visually providing feedback to a user to achieve a desired sustainability rating based at least in part on the predicted sustainability status;

transmitting the predicted sustainability status to a remote server;

receiving an overall sustainability status for the multiple backwash stations; and activating one or more appraisals associated with the overall sustainability status for the multiple backwash stations, wherein an appraisal is activated to provide a motivation to reduce water consumption.

17. The method of claim 16, further including:

generating one or more bounties based on positive appraisal associated with the overall sustainability status for the multiple backwash stations.

18. The method of claim 16, further including:

illuminating a lighted display based at least in part on a current status of the utilization of at least one resource at a single backwash station.

19. The method of claim 16, further including:

detecting behavior reducing the utilization of the at least one resource for the multiple backwash stations;

accumulating kudos when behavior reducing the utilization of the at least one resource is detected.

20. The method of claim 16, further including:

tracking energy usage from each backwash station;

determining a change in the energy usage for the multiple backwash stations; and forecasting a predicted sustainability status for the multiple backwash stations based at least in part on the determining.

21. The method of claim 16, further including:

illuminating a lighted display based at least in part on a predicted status of the utilization of at least one resource for the multiple backwash stations.

* * * * *